(12) United States Patent
Baxter et al.

(10) Patent No.: US 10,449,478 B2
(45) Date of Patent: *Oct. 22, 2019

(54) METHOD FOR REMOVAL OF A FOULANT FROM A CARRIER GAS IN A SINGLE VESSEL USING RECYCLED COLD SOLIDS

(71) Applicant: Sustainable Energy Solutions, LLC, Provo, UT (US)

(72) Inventors: Larry Baxter, Orem, UT (US); Kyler Stitt, Lindon, UT (US); Christopher Hoeger, Provo, UT (US); Aaron Sayre, Spanish Fork, UT (US); Eric Mansfield, Spanish Fork, UT (US); Nathan Davis, Bountiful, UT (US)

(73) Assignee: Hall Labs LLC, Provo, UT (US)

( * ) Notice: Subject to any disclaimer, the term of this patent is extended or adjusted under 35 U.S.C. 154(b) by 332 days.

This patent is subject to a terminal disclaimer.

(21) Appl. No.: 15/472,483

(22) Filed: Mar. 29, 2017

(65) Prior Publication Data

US 2018/0283780 A1 Oct. 4, 2018

(51) Int. Cl.
*F25J 3/08* (2006.01)
*B01D 53/00* (2006.01)
*B01D 8/00* (2006.01)
*B01D 5/00* (2006.01)

(52) U.S. Cl.
CPC .......... *B01D 53/002* (2013.01); *B01D 5/003* (2013.01); *B01D 8/00* (2013.01); *F25J 3/08* (2013.01); *B01D 2256/16* (2013.01); *B01D 2256/20* (2013.01); *B01D 2256/24* (2013.01); *B01D 2257/302* (2013.01); *B01D 2257/304* (2013.01); *B01D 2257/404* (2013.01); *B01D 2257/408* (2013.01); *B01D 2257/504* (2013.01); *B01D 2257/702* (2013.01); *B01D 2257/80* (2013.01); *B01D 2258/0283* (2013.01)

(58) Field of Classification Search
CPC ........ F25J 3/08; F25J 2205/20; F25J 2210/60; F25J 2220/66; F25J 2220/68; F25J 2210/70; F25J 2290/44; B01D 8/00; B01D 7/00; B01D 7/02; B01D 53/002; B01D 53/508

See application file for complete search history.

(56) References Cited

U.S. PATENT DOCUMENTS 2,966,037 A * 12/1960 Gifford ...................... F25J 3/08
165/104.18
3,791,110 A * 2/1974 Klein ...................... B01D 7/02
55/338

(Continued)

*Primary Examiner* — Brian M King

(57) ABSTRACT

A method for removal of a foulant from a carrier gas is disclosed. A solids conveyance device that spans a vessel and a solids coolant system are provided. A cold solid foulant is provided to the solid inlet of the vessel. The carrier gas containing the foulant is provided to the carrier gas inlet of the vessel. The foulant condenses or desublimates onto the recycled solid foulant, forming a foulant-depleted carrier gas and a solid foulant product. The solids conveyance device passes the solid foulant product out of the vessel. The foulant-depleted carrier gas leaves the vessel. The solid foulant product is split into a final solid foulant product and a recycled solid foulant. The recycled solid foulant is cooled through the coolant system to produce the cold solid foulant. In this manner, the foulant is removed from the carrier gas.

13 Claims, 5 Drawing Sheets

(56) References Cited

U.S. PATENT DOCUMENTS

| | | | | |
|---|---|---|---|---|
| 5,307,638 A * | 5/1994 | Herzog | ............... | B01D 5/0024 |
| | | | | 165/104.15 |
| 2012/0125043 A1 * | 5/2012 | Cullinane | ............... | B01D 7/02 |
| | | | | 62/620 |
| 2012/0153514 A1 * | 6/2012 | Baxter | .................... | B01D 7/02 |
| | | | | 261/128 |

* cited by examiner

US 10,449,478 B2

METHOD FOR REMOVAL OF A FOULANT FROM A CARRIER GAS IN A SINGLE VESSEL USING RECYCLED COLD SOLIDS

This invention was made with government support under DE-FE0028697 awarded by The Department of Energy. The government has certain rights in the invention.

FIELD OF THE INVENTION

This invention relates generally to the field of cryogenic removal of foulants from a carrier gas.

BACKGROUND

The art of cryogenic capture of foulants from carrier gases is relatively young. The ability to capture foulants, like acid gases, is of great importance to environmentally sound industrial progress. However, existing capture technologies are extremely complex, requiring many unit operations to capture and purify acid gases, such as carbon dioxide. The ability to make a cryogenic capture process that minimizes unit operations, and therefore minimizes energy and financial costs, is required.

A study published by Tuiner from Eindhoven: Technische Universiteit in 2011, DOI 10.6100/IR719418, teaches a novel process concept for cryogenic CO2 capture. The concept disclosed utilized the periodic operation of cryogenically cooled pack beds. The present disclosure differs from this disclosure in that this disclosure teaches desublimation of CO2 onto a packed bed, not onto recycled solid CO2. Further, this disclosure teaches periodic operations rather than continuous operations. This disclosure is pertinent and may benefit from the methods disclosed herein and is hereby incorporated for reference in its entirety for all that it teaches.

SUMMARY

A method for removal of a foulant from a carrier gas is disclosed. A solids conveyance device that spans a vessel is provided. The vessel comprises a solid inlet, a carrier gas inlet, a depleted gas outlet, and a solid outlet. A solids coolant system is provided. A cold solid foulant is provided to the solid inlet of the vessel. The carrier gas containing the foulant is provided to the carrier gas inlet of the vessel. The foulant condenses or desublimates onto the recycled solid foulant, forming a foulant-depleted carrier gas and a solid foulant product. The solids conveyance device advances the solid foulant product through the vessel. The foulant-depleted carrier gas leaves the vessel through the depleted gas outlet and the solid foulant product leaves through the solid outlet. The solid foulant product is split into a final solid foulant product and a recycled solid foulant. The recycled solid foulant is cooled through the coolant system to produce the cold solid foulant. In this manner, the foulant is removed from the carrier gas.

The vessel may comprise aluminum, stainless steel, polymers, ceramics, or combinations thereof. The foulant may comprise carbon dioxide, nitrogen oxide, sulfur dioxide, nitrogen dioxide, sulfur trioxide, hydrogen sulfide, hydrogen cyanide, water, hydrocarbons with a freezing point below a freezing point of the carrier gas, or combinations thereof. The carrier gas may comprise combustion flue gas, syngas, producer gas, natural gas, steam reforming gas, any hydrocarbon that has higher volatility than the foulant, light gases, or combinations thereof.

The solid coolant system may comprise a plate-type solid heat exchanger, a horizontal bulk solid heat exchanger, a fluidized-bed heat exchanger, a hail tower, or combinations thereof. The solid coolant system may comprises a portion or portions of the vessel, with a gaseous coolant injected to cool the recycled solid foulant. The portions of the solid coolant system may or may not be contiguous in the vessel. The carrier gas inlet may be located after the solid coolant system.

The solids conveyance device may comprise an auger, a bucket elevator, or a conveyor belt. The auger and the vessel may be oriented at an angle comprising angles between 0 and 90 degrees versus horizontal. The conveyor belt may comprise a perforated belt. Any surface of the auger or conveyor belt exposed to the carrier gas may comprise ceramics, polytetrafluoroethylene, polychlorotrifluoroethylene, natural diamond, man-made diamond, chemical-vapor deposition diamond, polycrystalline diamond, or combinations thereof.

The final solid foulant product may be provided to a melting device that produces a final product comprising a liquid foulant. The foulant may comprise carbon dioxide and the melting device may be operated at a pressure above a pressure at which liquid carbon dioxide can exist.

The final solid foulant product may be warmed against the solid coolant system to provide a portion of refrigeration in the solid coolant system.

The splitting of the solid foulant product into the final solid foulant product and the recycled solid foulant may occur in a device comprising a screen, the screen causing the solid foulant particles larger than a maximum effective diameter to be removed as the final solid foulant product with the particles smaller than the maximum effective diameter to be passed as the recycled solid foulant.

The splitting of the solid foulant product into the final solid foulant product and the recycled solid foulant may occur in a device comprising a riffle splitter, rotary splitter, revolving feeder sectorial divider, or tube divider.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1:
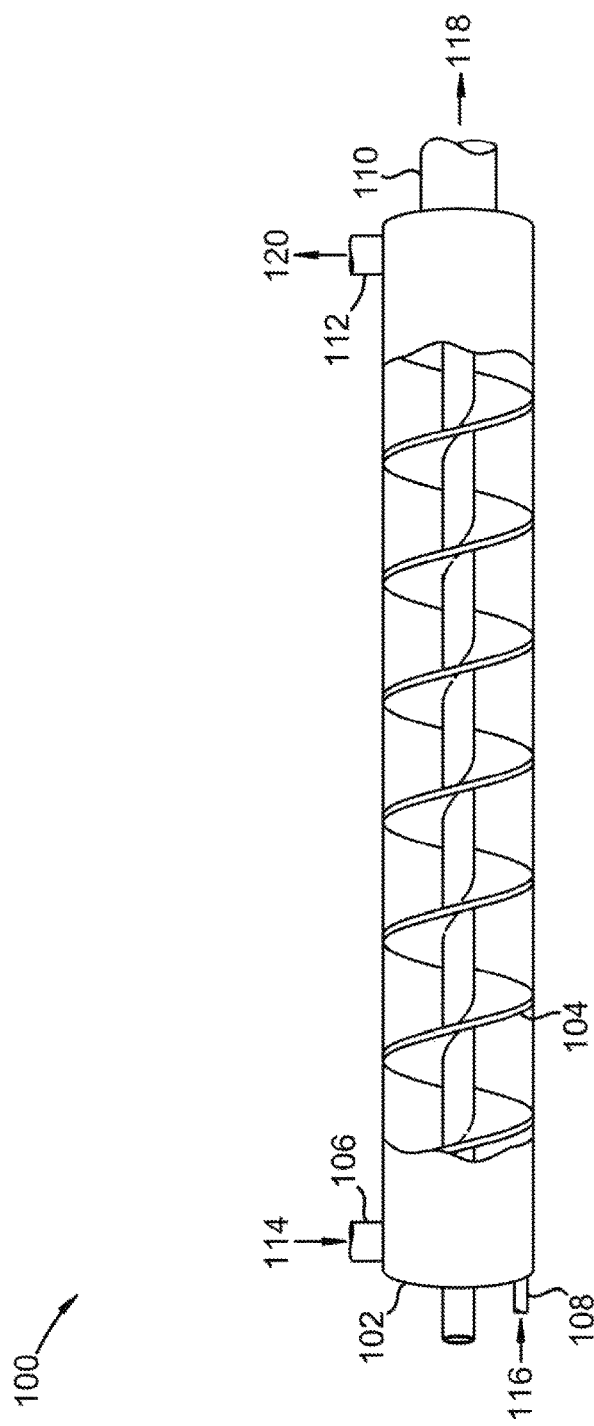
FIG. 1 shows an isometric cross-sectional view of a horizontally aligned vessel for use in removal of a foulant from a carrier gas.

Referring to FIG. 1, an isometric cross-sectional view of a horizontally aligned vessel for use in removal of a foulant from a carrier gas is shown at 100, as per one embodiment of the present invention. Vessel 102 comprises auger 104, solids inlet 106, gas inlet 108, solids outlet 110, and gas outlet 112. Cold solid foulant 114 is provided to solids inlet 106. Carrier gas 116, containing a foulant, is provided to gas inlet 108. The foulant condenses or desublimates onto cold solid foulant 114 to form solid foulant product 118 and foulant-depleted carrier gas 120. Auger 104 advances cold solid foulant 114 and carrier gas 116 through vessel 102. Foulant-depleted carrier gas 120 leaves vessel 102 by passing through gas outlet 112. Solid foulant product 118 leaves vessel 102 through solids outlet 110. In this manner, the foulant is removed from carrier gas 120. Solid foulant product 118 is split into a final product stream and a recycled solid foulant. The recycled solid foulant is cooled in a coolant system to produce cold solid foulant 114.

Figure 2:
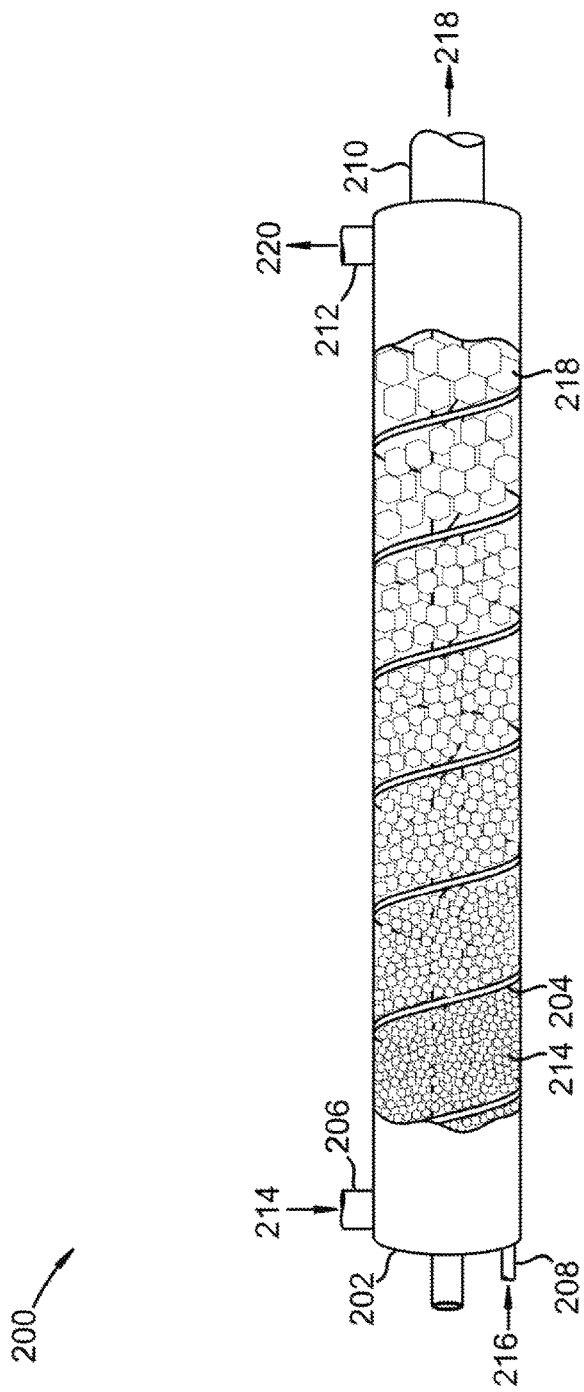
FIG. 2 shows an isometric cross-sectional view of a horizontally aligned vessel for use in removal of a foulant from a carrier gas.

Referring to FIG. 2, an isometric cross-sectional view of a horizontally aligned vessel for use in removal of carbon dioxide from a flue gas is shown at 200, as per one embodiment of the present invention. Vessel 202 comprises auger 204, solids inlet 206, gas inlet 208, solids outlet 210, and gas outlet 212. Cold solid foulant 214 is provided to solids inlet 206. Flue gas 216, containing carbon dioxide, is provided to gas inlet 208. The carbon dioxide desublimates onto cold solid foulant 214 to form solid foulant product 218 and foulant-depleted flue gas 220. Auger 204 advances cold solid foulant 214 and flue gas 216 through vessel 202. Foulant-depleted flue gas 220 leaves vessel 202 by passing through gas outlet 212. Solid foulant product 218 leaves vessel 202 through solids outlet 210. In this manner, the carbon dioxide is removed from flue gas 220. Cold solid foulant 214 is shown increasing in size until it becomes solid foulant product 218. This represents the desublimation of the foulant onto cold solid foulant 214. Solid foulant product 218 is split into a final product stream and a recycled solid foulant. The recycled solid foulant is cooled in a coolant system to produce cold solid foulant 214.

Figure 3:
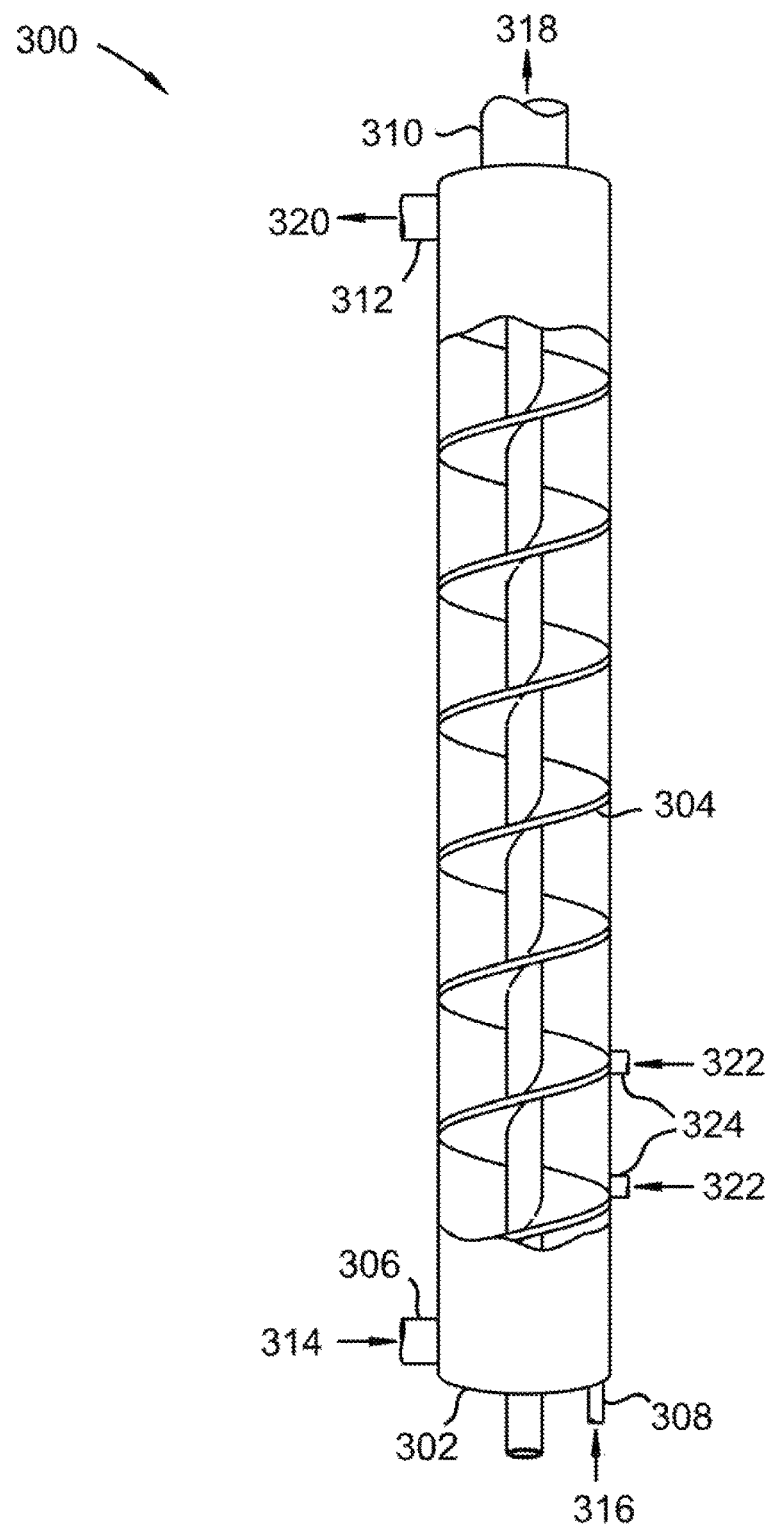
FIG. 3 shows an isometric cross-sectional view of a vertically aligned vessel for use in removal of a foulant from a carrier gas.

Referring to FIG. 3, an isometric cross-sectional view of a vertically aligned vessel for use in removal of a foulant from a carrier gas is shown at 300, as per one embodiment of the present invention. Vessel 302 comprises auger 304, solids inlet 306, gas inlet 308, solids outlet 310, and gas outlet 312. Cold solid foulant 314 is provided to solids inlet 306. Carrier gas 316, containing a foulant, is provided to gas inlet 308. The foulant condenses or desublimates onto cold solid foulant 314 to form solid foulant product 318 and foulant-depleted carrier gas 320. Auger 304 advances cold solid foulant 314 and carrier gas 316 through vessel 302. Foulant-depleted carrier gas 320 leaves vessel 302 by passing through gas outlet 312. Solid foulant product 318 leaves vessel 302 through solids outlet 310. In this manner, the foulant is removed from carrier gas 320. Solid foulant product 318 is split into a final product stream and a recycled solid foulant. The recycled solid foulant is cooled in a coolant system to produce cold solid foulant 314. In this embodiment, cooling gas 322 is injected into nozzles 324, causing a portion of the coolant system to be a part of vessel 302.

Figure 4:
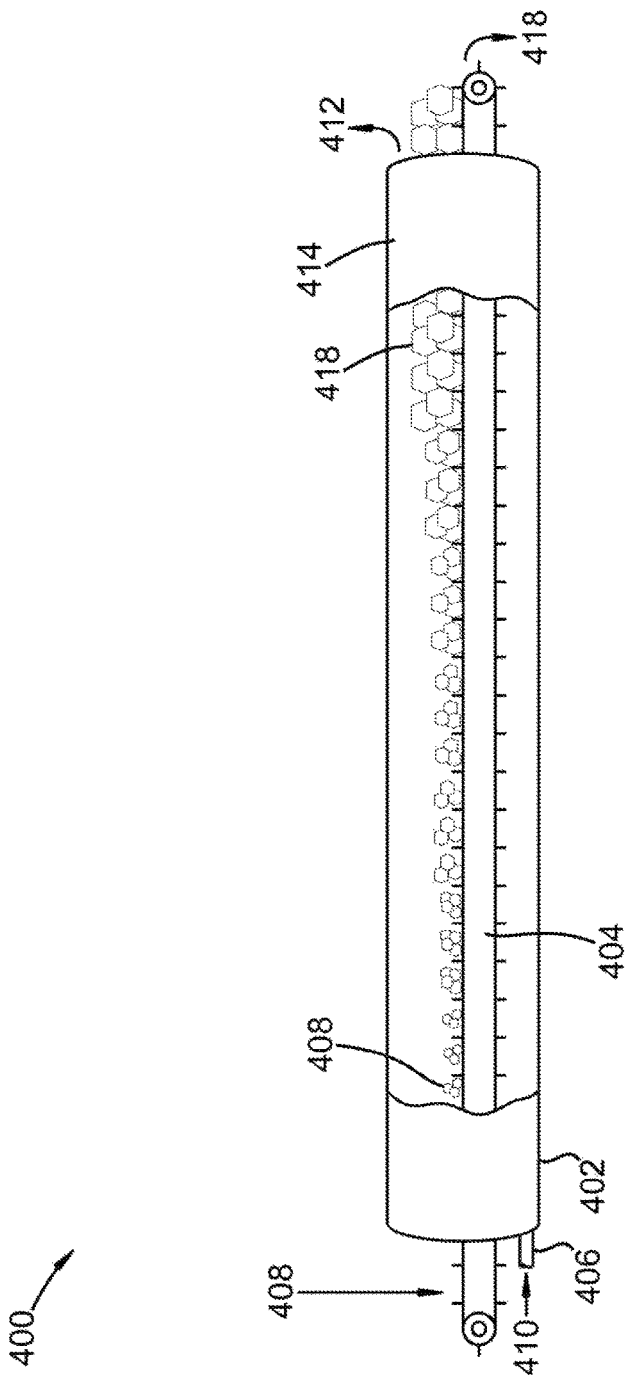
FIG. 4 shows an isometric cross-sectional view of a horizontally aligned vessel for use in removal of a foulant from a carrier gas.

Referring to FIG. 4, an isometric cross-sectional view of a horizontally aligned vessel for use in removal of a foulant from a carrier gas is shown at 400, as per one embodiment of the present invention. Vessel 402 comprises conveyor belt 404, gas inlet 406, and product outlet 414. Cold solid foulant 408 is provided to conveyor belt 404. Carrier gas 410, containing a foulant, is provided to gas inlet 406. The foulant condenses or desublimates onto cold solid foulant 408 to form solid foulant product 410 and foulant-depleted carrier gas 412. Conveyor belt 404 advances cold solid foulant 408 through vessel 402 and out product outlet 414. Foulant-depleted carrier gas 412 leaves vessel 402 at product outlet 414. In this manner, the foulant is removed from carrier gas 420. Cold solid foulant 408 is shown increasing in size until it becomes solid foulant product 418. This represents the desublimation of the foulant onto cold solid foulant 408. Solid foulant product 418 is split into a final product stream and a recycled solid foulant. The recycled solid foulant is cooled in a coolant system to produce cold solid foulant 408.

Figure 5:
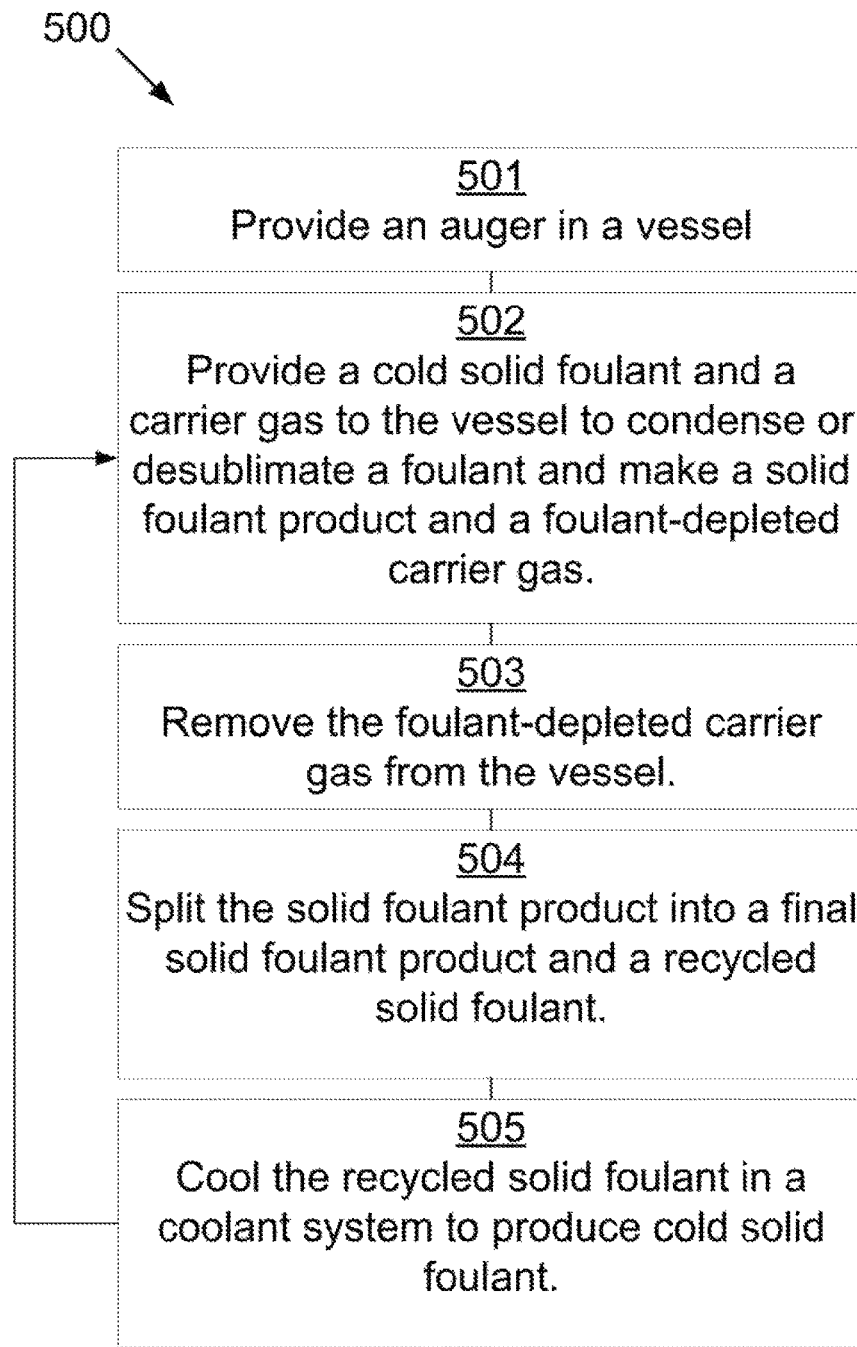
FIG. 5 shows a method for removing a foulant from a carrier gas.

Referring to FIG. 5, a method for removing a foulant from a carrier gas is shown at 500, as per one embodiment of the present invention. An auger in a vessel is provided 501. A cold solid foulant and a carrier gas are provided to the vessel, where the foulant condenses or desublimates onto the cold solid foulant to form a solid foulant product and a foulant-depleted carrier gas 502. The foulant-depleted carrier gas is removed from the vessel 503. The solid foulant product is removed from the vessel and split into a final solid foulant product and a recycled solid foulant 504. The recycled solid foulant is sent to a coolant system to produce the cold solid foulant to be used in the vessel 505.

In some embodiments, the vessel comprises aluminum, stainless steel, polymers, ceramics, or combinations thereof.

In some embodiments, the foulant comprises carbon dioxide, nitrogen oxide, sulfur dioxide, nitrogen dioxide, sulfur trioxide, hydrogen sulfide, hydrogen cyanide, water, hydrocarbons with a freezing point below a freezing point of the carrier gas, or combinations thereof.

In some embodiments, the carrier gas comprises combustion flue gas, syngas, producer gas, natural gas, steam reforming gas, any hydrocarbon that has higher volatility than the foulant, light gases, or combinations thereof.

In some embodiments, the solid coolant system comprises a plate-type solid heat exchanger, a horizontal bulk solid heat exchanger, a fluidized-bed heat exchanger, a hail tower, or combinations thereof. In some embodiments, the solid coolant system comprises a portion or portions of the vessel, with a gaseous coolant injected to cool the recycled solid foulant. In some embodiments, the portions of the solid coolant system are not contiguous in the vessel. In some embodiments, the carrier gas inlet is located after the solid coolant system.

In some embodiments, the solids conveyance device comprises an auger. In some embodiments, the auger and the vessel are oriented at an angle comprising angles between 0 and 90 degrees versus horizontal. In some embodiments, any surface of the auger exposed to the carrier gas comprises ceramics, polytetrafluoroethylene, polychlorotrifluoroethylene, natural diamond, man-made diamond, chemical-vapor deposition diamond, polycrystalline diamond, or combinations thereof.

In some embodiments, the solids conveyance device comprises a bucket elevator.

In some embodiments, the solids conveyance device comprises a conveyor belt. In some embodiments, the conveyor belt comprises a perforated belt. In some embodiments, any surface of the perforated belt exposed to the carrier gas comprises ceramics, polytetrafluoroethylene, polychlorotrifluoroethylene, natural diamond, man-made diamond, chemical-vapor deposition diamond, polycrystalline diamond, or combinations thereof.

In some embodiments, the final solid foulant product is provided to a melting device that produces a final product comprising a liquid foulant.

In some embodiments, the foulant comprises carbon dioxide and the melting device is operated at a pressure above a pressure at which liquid carbon dioxide can exist.

In some embodiments, the final solid foulant product is warmed against the solid coolant system to provide a portion of refrigeration in the solid coolant system.

In some embodiments, the splitting of the solid foulant product into the final solid foulant product and the recycled solid foulant occurs in a device comprising a screen, the screen causing the solid foulant particles larger than a maximum effective diameter to be removed as the final solid foulant product with the particles smaller than the maximum effective diameter to be passed as the recycled solid foulant. In some embodiments, splitting of the solid foulant product into the final solid foulant product and the recycled solid foulant occurs in a device comprising a riffle splitter, rotary splitter, revolving feeder sectorial divider, or tube divider.

Combustion flue gas consists of the exhaust gas from a fireplace, oven, furnace, boiler, steam generator, or other combustor. The combustion fuel sources include coal, hydrocarbons, and biomass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

The invention claimed is:

1. A method for removal of a foulant from a carrier gas, the method comprising:

providing a solids conveyance device that spans a vessel, the vessel comprising a solid inlet, a carrier gas inlet, a depleted gas outlet, and a solid outlet;
providing a solids coolant system;
providing a cold solid foulant to the solid inlet of the vessel;
providing the carrier gas containing a feed foulant to the carrier gas inlet of the vessel, wherein the feed foulant condenses or desublimates onto the cold solid foulant, forming a foulant-depleted carrier gas and a solid foulant product; and,
causing the solids conveyance device to advance the solid foulant product through the vessel, wherein the foulant-depleted carrier gas leaves the vessel through the depleted gas outlet and the solid foulant product leaves through the solid outlet;
splitting the solid foulant product into a final solid foulant product and a recycled solid foulant; and,
cooling the recycled solid foulant through the solids coolant system to produce the cold solid foulant.

2. The method of claim 1, wherein the vessel comprises aluminum, stainless steel, polymers, ceramics, or combinations thereof.

3. The method of claim 1, wherein the feed foulant comprises carbon dioxide, nitrogen oxide, sulfur dioxide, nitrogen dioxide, sulfur trioxide, hydrogen sulfide, hydrogen cyanide, water, hydrocarbons with a freezing point below a freezing point of the carrier gas, or combinations thereof.

4. The method of claim 1, wherein the carrier gas comprises combustion flue gas, syngas, producer gas, natural gas, steam reforming gas, any hydrocarbon that has higher volatility than the foulant, light gases, or combinations thereof.

5. The method of claim 1, wherein the solids conveyance device comprises an auger.

6. The method of claim 5, wherein the auger and the vessel are oriented at an angle comprising angles between 0 and 90 degrees versus horizontal.

7. The method of claim 6, wherein any surface of the auger exposed to the carrier gas comprises ceramics, polytetrafluoroethylene, polychlorotrifluoroethylene, natural diamond, man-made diamond, chemical-vapor deposition diamond, polycrystalline diamond, or combinations thereof.

8. The method of claim 1, wherein the solids conveyance device comprises a conveyor belt.

9. The method of claim 8, wherein the conveyor belt comprises a perforated belt.

10. The method of claim 9, wherein any surface of the perforated belt exposed to the carrier gas comprises ceramics, polytetrafluoroethylene, polychlorotrifluoroethylene, natural diamond, man-made diamond, chemical-vapor deposition diamond, polycrystalline diamond, or combinations thereof.

11. The method of claim 1, wherein the final solid foulant product is provided to a melting device that produces a final product comprising a liquid foulant.

12. The method of claim 11, wherein the feed foulant comprises carbon dioxide and the melting device is operated at a pressure above a pressure at which liquid carbon dioxide can exist.

13. The method of claim 1, wherein the final solid foulant product is warmed against the solid coolant system to provide a portion of refrigeration in the solid coolant system.

* * * * *